(12) United States Patent
Nakasaka et al.

(10) Patent No.: US 12,324,991 B2
(45) Date of Patent: Jun. 10, 2025

(54) GAME SYSTEM, COMPUTER-IMPLEMENTED METHOD OF OPERATING GAME SYSTEM, AND NON-TRANSITORY COMPUTER-READABLE RECORDING MEDIUM

(71) Applicant: KONAMI AMUSEMENT CO., LTD., Ichinomiya (JP)

(72) Inventors: Noboru Nakasaka, Aichi (JP); Manabu Furuya, Aichi (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 152 days.

(21) Appl. No.: 17/875,855

(22) Filed: Jul. 28, 2022

(65) Prior Publication Data

US 2022/0362678 A1    Nov. 17, 2022

Related U.S. Application Data

(63) Continuation of application No. PCT/JP2021/003893, filed on Feb. 3, 2021.

(30) Foreign Application Priority Data

Feb. 5, 2020    (JP) ................. 2020-018089

(51) Int. Cl.
*A63F 13/75*   (2014.01)
*A63F 13/71*   (2014.01)
(Continued)

(52) U.S. Cl.
CPC ............. *A63F 13/75* (2014.09); *A63F 13/71* (2014.09); *A63F 13/79* (2014.09); *A63F 13/655* (2014.09);
(Continued)

(58) Field of Classification Search
None
See application file for complete search history.

(56) References Cited

U.S. PATENT DOCUMENTS 9,619,965 B1    4/2017  Hill
2008/0214286 A1*  9/2008  Lutnick ............... G07F 17/3262
                                                          463/25
(Continued)

FOREIGN PATENT DOCUMENTS

JP    2012-125644 A    7/2012
JP    2013-63169 A     4/2013
(Continued)

OTHER PUBLICATIONS

Office Action dated May 11, 2021 issued by the Japanese Patent Office in Japanese Application No. 2020-018089.
(Continued)

*Primary Examiner* — Jason T Yen
(74) *Attorney, Agent, or Firm* — Sughrue Mion, PLLC

(57) ABSTRACT

A game system includes one or more memories configured to store instructions and one or more processors communicatively connected to the one or more memories. The one or more processors are configured to execute the instructions to: select one of a plurality of modes including a first mode and a second mode; execute authentication processing using biometric information of a player; permit the player to play a game without requiring the authentication processing in the first mode; and permit the player to play the game subject to success of the authentication processing in the second mode.

11 Claims, 10 Drawing Sheets

(51) Int. Cl.
*A63F 13/79* (2014.01)
*A63F 13/655* (2014.01)

(52) U.S. Cl.
CPC ............... *A63F 2300/5546* (2013.01); *A63F 2300/5586* (2013.01)

(56) References Cited

U.S. PATENT DOCUMENTS

| | | | | |
|---|---|---|---|---|
| 2010/0203943 | A1* | 8/2010 | Hughes | G07F 17/32 463/25 |
| 2014/0179390 | A1* | 6/2014 | Kelly | G07F 17/3244 463/19 |
| 2014/0274385 | A1* | 9/2014 | Elias | G07F 17/3255 463/31 |
| 2015/0087409 | A1* | 3/2015 | Levy | A63F 13/335 463/25 |
| 2016/0027260 | A1* | 1/2016 | Pierce | G07F 17/3276 463/7 |
| 2017/0065892 | A1* | 3/2017 | Loeb | A63F 13/358 |
| 2017/0087475 | A1* | 3/2017 | Perry | A63F 13/25 |
| 2019/0026991 | A1* | 1/2019 | Torres | G07F 17/3276 |
| 2020/0020205 | A1* | 1/2020 | Moskowitz | G07F 17/322 |
| 2020/0151015 | A1* | 5/2020 | Zhao | G06F 9/4881 |

FOREIGN PATENT DOCUMENTS

| | | |
|---|---|---|
| JP | 5628393 B1 | 11/2014 |
| KR | 10-2003-0063824 A | 7/2003 |
| KR | 10-2010-0076238 A | 7/2010 |

OTHER PUBLICATIONS

Office Action dated Jan. 26, 2021 issued by the Japanese Patent Office in Japanese Application No. 2020-018089.
International Search Report dated Mar. 9, 2021 in International Application No. PCT/JP2021/003893.
Written Opinion of the International Searching Authority dated Mar. 9, 2021 in International Application No. PCT/JP2021/003893.
World Web Archive National Diet Library Internet Material Collection, Oct. 2018, retrieved from the Internet Jan. 2021: https://web.archive.org/web/20181004145610/https:/taiko.namco-ch.net/taiko/howto/battlemode.php, see descriptions of "Performance Battle" and "Select Mode", 11 pages total.
Pre-play guide—Nosu-shirube (Nostalgia Guide wiki), Oct. 2019, retrieved from the Internet Jan. 2021: https://seesaawiki.jp/nstl/d/%A5%D7%A5%EC%A5%A4%C1%B0%A5%AC%A5%A4%A5%C9, see descriptions of Selectable Music and Modes, 6 pages total.
Office Action dated Jun. 21, 2024 issued by the Korean Patent Office in Korean Application No. 10-2022-7028692.
Office Action dated Jul. 19, 2024 issued by the Chinese Patent Office in Chinese Application No. 202180012488.8.
Communication issued Dec. 7, 2024 in Chinese Patent Application No. 202180012488.8.
Communication issued Feb. 11, 2025 in Chinese Patent Application No. 202180012488.8.
Communication dated Feb. 24, 2025 issued by Korean Patent Office in Korean Application No. 10-2022-7028692.
Office Action dated Apr. 18, 2025 issued by the Chinese Patent Office in Chinese Application No. 202180012488.8.

* cited by examiner

GAME SYSTEM, COMPUTER-IMPLEMENTED METHOD OF OPERATING GAME SYSTEM, AND NON-TRANSITORY COMPUTER-READABLE RECORDING MEDIUM

CROSS REFERENCE TO RELATED APPLICATION

This Application is a Continuation Application of PCT Application No. PCT/JP2021/003893, filed Feb. 3, 2021, and is based on, and claims priority from, Japanese Patent Application No. 2020-18089, filed Feb. 5, 2020, the entire contents of each of which are incorporated herein by reference.

BACKGROUND OF THE INVENTION

Field of the Invention

The present disclosure relates to games.

Description of Related Art

In events (e-sports) such as game competitions in which a plurality of players competes against each other in a game, cheating in which a player who wants to achieve good results has another person, such as a skilled gainer, play the game in place of the player, has become a problem. Therefore, it is important to authenticate the legitimacy of a player who actually plays a game (for example, a fact that the player is a person registered in advance). Japanese Patent No. 5628393 suggests a technique for verifying the legitimacy of each competitor in various types of competitions. For example, it is possible to determine the legitimacy of a player by executing authentication processing using biometric information of the player. However, since pre-registration of the biometric information and the authentication processing for playing are required, it is impossible to satisfy a demand for a player who wishes to play a game easily.

SUMMARY OF THE INVENTION

In view of the circumstances described above, an object of one aspect according to the present disclosure is to satisfy both a demand to ensure the legitimacy of a player and a demand to play a game easily.

In one aspect, a game system includes one or more memories configured to store instructions, and one or more processors communicatively connected to the one or more memories. The one or more processors are configured to execute the instructions to: select one of a plurality of modes including a first mode and a second mode; execute authentication processing using biometric information of a player; permit the player to play a game without requiring the authentication processing in the first mode; and permit the player to play the game subject to success of the authentication processing in the second mode.

In another aspect, a computer-implemented method of operating a game system includes: selecting one of a plurality of modes including a first mode and a second mode; permitting a player to play a game without requiring authentication processing using biometric information of the player in the first mode; and permitting the player to play the game subject to success of the authentication processing in the second mode.

In yet another aspect, a non-transitory computer-readable recording medium storing a program executable by a computer system. The computer system is configured to execute the program to: select one of a plurality of modes including a first mode and a second mode; execute authentication processing using biometric information of a player; permit the player to play a game without requiring the authentication processing in the first mode; and permit the player to play the game subject to success of the authentication processing in the second mode.

DESCRIPTION OF EMBODIMENTS

Embodiments according to the present disclosure will be described with reference to the drawings. The embodiments described below include various technical limitations. The scope of the present disclosure is not limited to the embodiments described below.

First Embodiment

Figure 1:
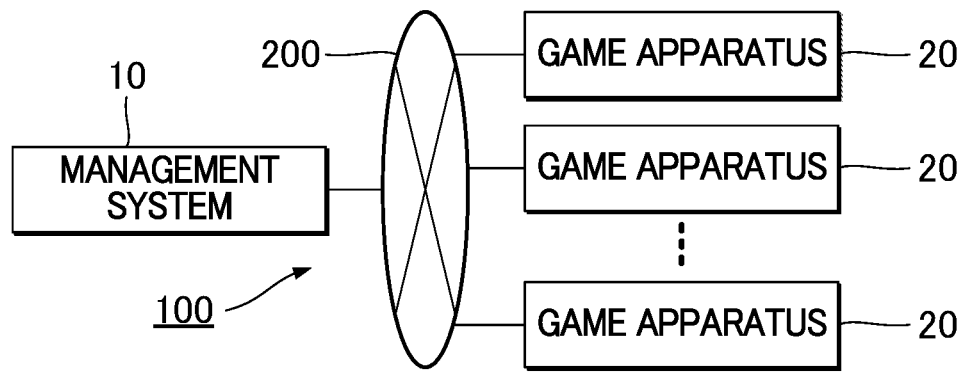
FIG. 1 is a block diagram showing a configuration of a game system according to a first embodiment.

FIG. 1 is a block diagram showing a configuration of a game system 100 according to a first embodiment. As shown in FIG. 1, the game system 100 according to the first embodiment includes a management system 10 and a plurality of game apparatuses 20. Each of the plurality of game apparatuses 20 is a computer system to provide a game to a player. The plurality of game apparatuses 20 is installed, for example, in an amusement facility. The amusement facility is an entertainment facility, such as an amusement arcade, or a commercial facility such as a shopping center, for example. Each of the plurality of game apparatuses 20 is communicable with the management system 10 via a communication network 200, such as the Internet, for example. The management system 10 is a computer system installed inside or outside the amusement facility, and the management system 10 controls an operation of each of the plurality of game apparatuses 20.

As well as being used for a player to play a game alone, each of the plurality of game apparatuses 20 may be used for each player of a plurality of players to play a game in an event (hereinafter referred to as a "competitive event") such as a game competition in which each of the plurality of players competes against the others. The game played by each player in the competitive event may be a game in which each of the plurality of players competes against the others to determine a winner among them, or a game in which a ranking of each player is determined in accordance with a result (for example, a score) of the game played alone by each player, for example. In the first embodiment, the contents of a game played by a player under normal circumstances different from a competitive event is substantially the same as the contents of a game played by each player in a competitive event.

The game apparatus 20 according to the first embodiment operates in an operation mode that is a normal mode or a preliminary mode. The normal mode is an operation mode in which each player plays the game in a normal situation different from a competitive event. On the other hand, the preliminary mode is an operation mode in which a player plays the game in a competitive event. The normal mode is an example of a "first mode" and the preliminary mode is an example of a "second mode".

A player who achieves good results in a competitive event may receive awards and rewards such as a prize. Therefore, in the competitive event, it is important to authenticate the legitimacy of a player who actually plays the game (specifically, a fact that the player is the person registered in advance). Specifically, in the competitive event, it is necessary to eliminate cheating (hereinafter referred to as "fraudulent substitution") in which a player who wants to achieve good results has another person, such as a skilled gainer, play the game in place of the player.

In view of the circumstances described above, authentication processing (i.e., biometric authentication) using biometric information of a player is required to play the game in the competitive event according to the first embodiment. On the other hand, a configuration, in which the authentication processing using the biometric information of the player is also required in a normal situation different from the competitive event, is not capable of satisfying a demand for the player who wishes to play the game easily. In view of the circumstances described above, the authentication processing using the biometric information of the player is not required in the normal mode according to the first embodiment.

The competitive event according to the first embodiment is divided into a preliminary stage and a final stage, for example. The preliminary stage is a stage for selecting a predetermined number of players, who progresses to the final stage, from among a large number of players. On the other hand, the final stage is a stage in which winners or rankings are determined among the predetermined number of players who passed the preliminary stage. The preliminary stage is held in an environment in which a relatively small number of spectators watches the preliminary stage or in which no spectators are present. On the other hand, the final stage is watched by a large number of spectators in a large venue. In some cases, a video recording of the final stage is widely distributed to a large number of spectators to watch the final stage. As described above, since it is practically difficult to substitute a player in the final stage watched by a large number of spectators, the described fraudulent substitution particularly becomes a problem in the preliminary stage. Therefore, the authentication processing in the game system 100 according to the first embodiment is executed in the preliminary stage in the competitive event.

Figure 2:
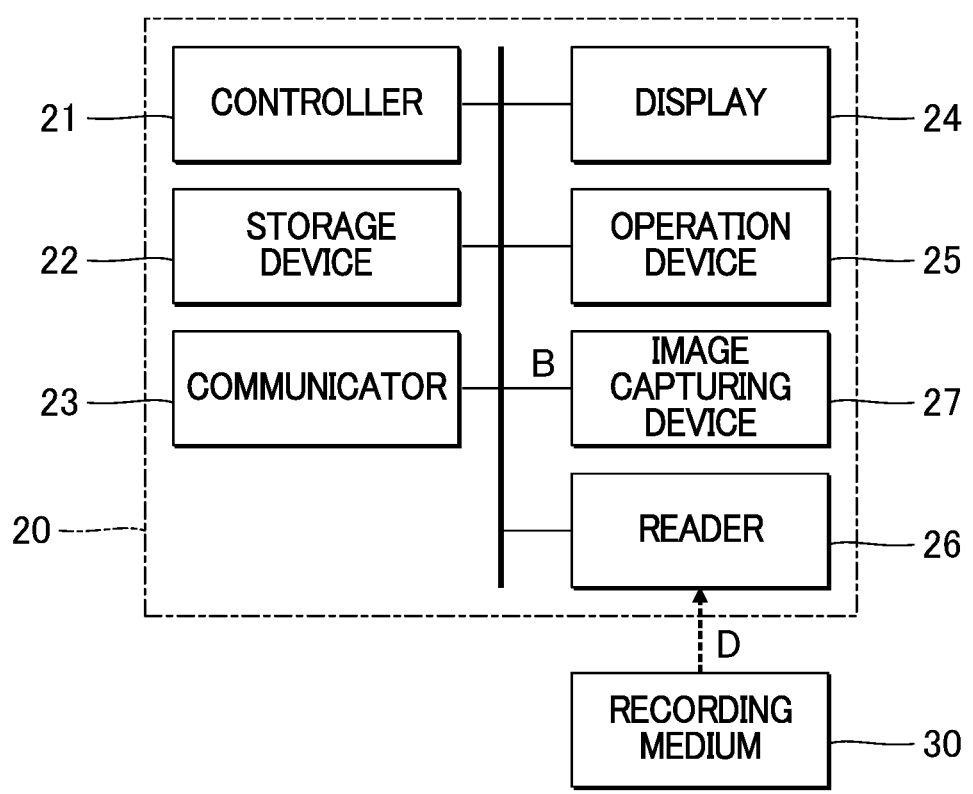
FIG. 2 is a block diagram showing a configuration of a game apparatus.

FIG. 2 is a block diagram showing a specific configuration of each of the plurality of game apparatuses 20. As shown in FIG. 2, the game apparatus 20 according to the first embodiment includes a controller 21, a storage device 22, a communicator 23, a display 24, an operation device 25, a reader 26, and an image capturing device 27. As well as being realized by a single apparatus, the game apparatus 20 may be realized by a plurality of apparatuses (i.e., a system) separate from each other. As well as being realized by an apparatus dedicated for a game in an amusement facility, the game apparatus 20 may be realized by an information terminal such as a smartphone and a tablet.

The controller 21 is one or more processors that control each element of the game apparatus 20. Specifically, the controller 21 includes at least one processor such as a central processing unit (CPU), a graphics processing unit (GPU), a digital signal processor (DSP), a field programmable gate array (FPGA), or an application specific integrated circuit (ASIC). The communicator 23 communicates with the management system 10 via the communication network 200 under control by the controller 21. In a game played by a plurality of players against each other using different game apparatuses 20, the communicator 23 of each game apparatus 20 may communicate with other game apparatuses 20 via the communication network 200.

The storage device 22 is one or more memories that store programs executed by the controller 21 and various data used by the controller 21. For example, the storage device 22 includes a known recording medium such as a semiconductor recording medium and a magnetic recording medium, or a combination of different types of recording mediums. The storage device 22 may be a portable recording medium detachable from the game apparatus 20, or an external recording medium (for example, a cloud storage server) communicable with the game apparatus 20.

The display 24 displays images under control by the controller 21. For example, the display 24 is a display panel such as a liquid crystal display panel and an organic electroluminescent display panel. The controller 21 causes the display 24 to display game images representative of situations of a game, for example. The operation device 25 is an input device to receive indication from a player. The operation device 25 is a plurality of operation elements operable by a player, or a touch panel to detect contact by a player.

Each of the plurality of players possesses a recording medium 30. The recording medium 30 is a portable medium (for example, an IC card) storing identification information D for identifying a player. The reader 26 acquires the identification information D from the recording medium 30 through communication with the recording medium 30. As well as a non-contact reading device to acquire the identification information D through near field communication with the recording medium 30, a contact reading device to acquire the identification information D through a terminal in contact with the recording medium 30 is used by the reader 26.

The image capturing device 27 is an image input device to capture images. The image capturing device 27 according to the first embodiment captures images of the face of a player. Specifically, the image capturing device 27 includes an optical system, such as a photographic lens, and an image sensor to generate image data in accordance with incident light from the optical system. The image data representative of the face of the player captured by the image capturing device 27 is used as biometric information B representative of biometric characteristics of the player. In the first embodiment, the authentication processing (specifically, face authentication) regarding the player is executed using the biometric information B. As will be understood from the above description, the image capturing device 27 according to the first embodiment functions as an element (biometric information generator) to generate the biometric information B.

Figure 3:
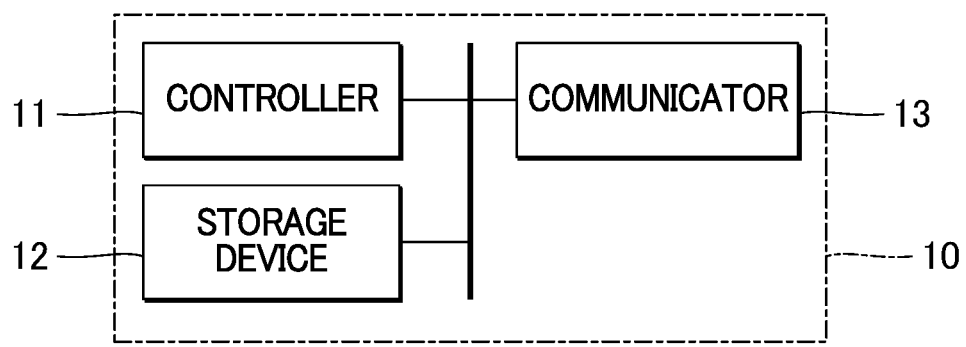
FIG. 3 is a block diagram showing a configuration of a management system.

FIG. 3 is a block diagram showing a specific configuration of the management system 10. As shown in FIG. 3, the management system 10 according to the first embodiment includes a controller 11, a storage device 12, and a communicator 13. As well as being realized by a single apparatus, the management system 10 may be realized by a plurality of apparatus separate from each other.

The controller 11 is one or more processors to control each element of the management system 10. Specifically, the controller 11 includes at least one processor such as a CPU, a GPU, a DSP, an FPGA, or an ASIC. The communicator 13 communicates with the plurality of game apparatuses 20 via the communication network 200 under control by the controller 11.

The storage device 12 is one or more memories that store programs executed by the controller 11 and various data used by the controller 11. For example, the storage device 12 includes a known recording medium such as a semiconductor recording medium and a magnetic recording medium, or a combination of different types of recording mediums. The storage device 12 may be a portable recording medium detachable from the management system 10, or an external recording medium (for example, a cloud storage server) communicable with the management system 10.

Figure 4:
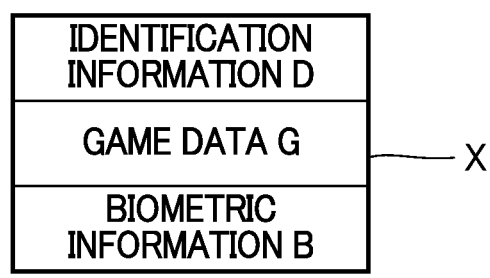
FIG. 4 is a schematic diagram of registration data.

The storage device 12 according to the first embodiment stores registration data X in FIG. 4 for each player having the recording medium 30. As shown in FIG. 4, one piece of registration data X for each player includes the identification information D of the player and game data G representative of situations of the game played by the player in the past. For example, the game data G represents a value of ability of a character operated by the player and results of play by the player (for example, stages already cleared). Other identification information associated with the identification information D recorded on the recording medium 30 may be registered in the registration data X instead of the identification information D in FIG. 4.

For a player whose participation in the competitive event has been previously registered from among the plurality of players having the recording medium 30, the biometric information B in addition to both the identification information D and the game data G is included in the registration data X. The biometric information B of each player is the image data representative of the face of the player captured by the image capturing device 27, as described above.

Figure 5A:
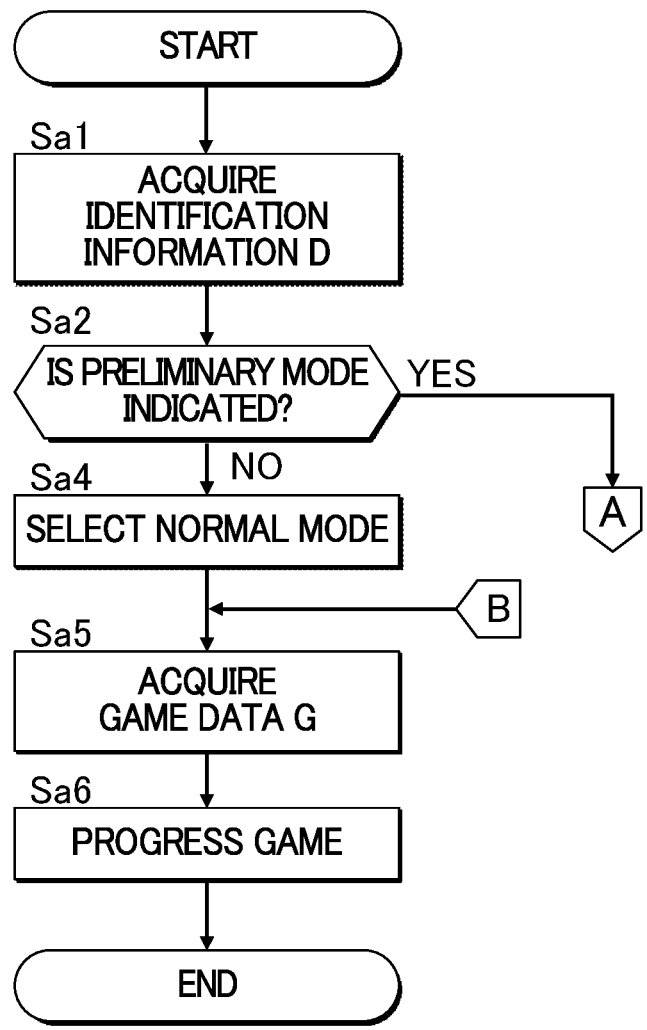
FIG. 5A is a flowchart showing a specific procedure of a part of processing executed by the game apparatus.
Figure 5B:
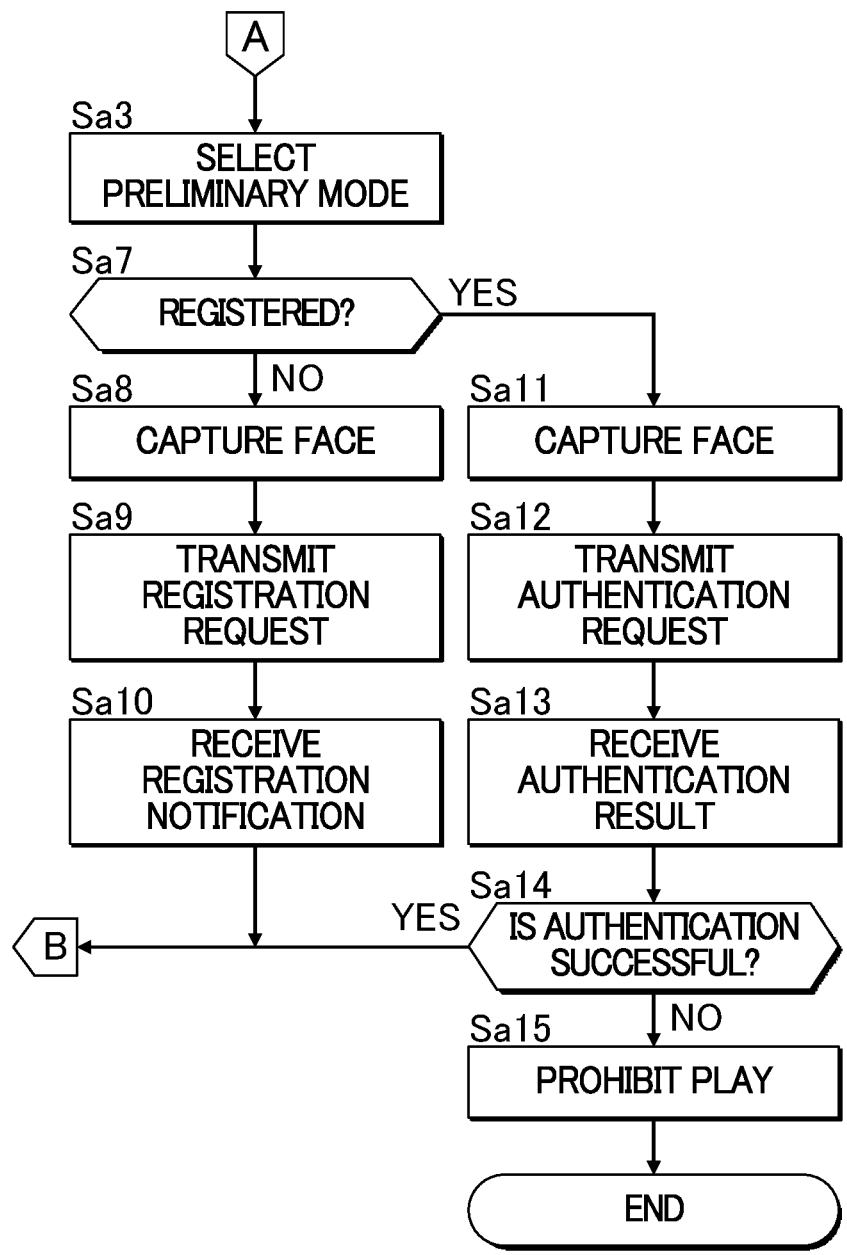
FIG. 5B is a flowchart showing a specific procedure of another part of processing executed by the game apparatus.

FIGS. 5A and 5B each show a specific procedure of processing executed by the game apparatus 20 according to the first embodiment. For example, the processing in FIG. 5A starts each time the player indicates the start of the game by operating the operation device 25. To start the game, the player moves the recording medium 30 to the reader 26. The controller 21 acquires the identification information D from the recording medium 30 by controlling the reader 26 (Sa1). The controller 21 may acquire other identification information associated with the identification information D stored on the recording medium 30 from an external device that manages a correspondence relationship of the identification information.

The player selects an operation mode (normal mode/preliminary mode) of the game apparatus 20 by operating the operation device 25. Specifically, to participate in the competitive event, the player indicates the preliminary mode by operating the operation device 25. The controller 21 determines whether the selection of the preliminary mode is indicated by the player (Sa2).

When the preliminary mode is indicated by the player (Sa2: YES), the controller 21 selects the preliminary mode as an operation mode (Sa3). On the other hand, when the preliminary mode is not indicated by the player (Sa2: NO), the controller 21 selects the normal mode as an operation mode (Sa4). As will be understood from the above description, the controller 21 functions as a mode selector configured to select one of a plurality of operation modes including the normal mode and the preliminary mode.

As shown above, the controller 21 according to the first embodiment selects the preliminary mode based on the preliminary mode being indicated by the user, and the controller 21 selects the normal mode based on the preliminary mode not being indicated. In other words, in a situation that is not a special situation such as the competitive event, the normal mode is selected based on a fact that the preliminary mode is not indicated even when the player does not explicitly indicate the normal mode. Therefore, efforts for a large number of players, who do not participate in the competitive event, to select the normal mode, are reduced. However, the user may indicate the selection of the normal mode by operating the operation device 25.

In the preliminary mode, as described below, the player is permitted to play the game subject to the authentication processing using the biometric information B. On the other hand, in the normal mode, the controller 21 receives the game data G corresponding to the identification information D acquired from the recording medium 30 (or the game data G corresponding to other identification information associated with the identification information D) from the management system 10 (Sa5) to progress the game in which game data G is used (Sa6). In other words, in the normal mode, the player is permitted to play the game without requiring the authentication processing using the biometric information B.

A specific procedure of processing in the preliminary mode will be described below. As shown in FIG. 5B, based on the preliminary mode being selected (Sa3), the controller 21 determines whether the biometric information B of the player is registered in the management system 10 (Sa7). In other words, it is determined whether registration processing for the player was executed in the past. Specifically, the controller 21 inquires, of the management system 10, whether the biometric information B corresponding to the identification information D acquired from the recording medium 30 has been registered. The controller 11 of the management system 10 determines whether the biometric information B is registered in the registration data X including the identification information D notified from the game apparatus 20 to transmit a result of the determination to the inquiring game apparatus 20. Based on the biometric information B not being registered (Sa7: NO), the controller 21 executes processing to newly register the biometric information B of the player (Sa8 to Sa10).

Figure 6:
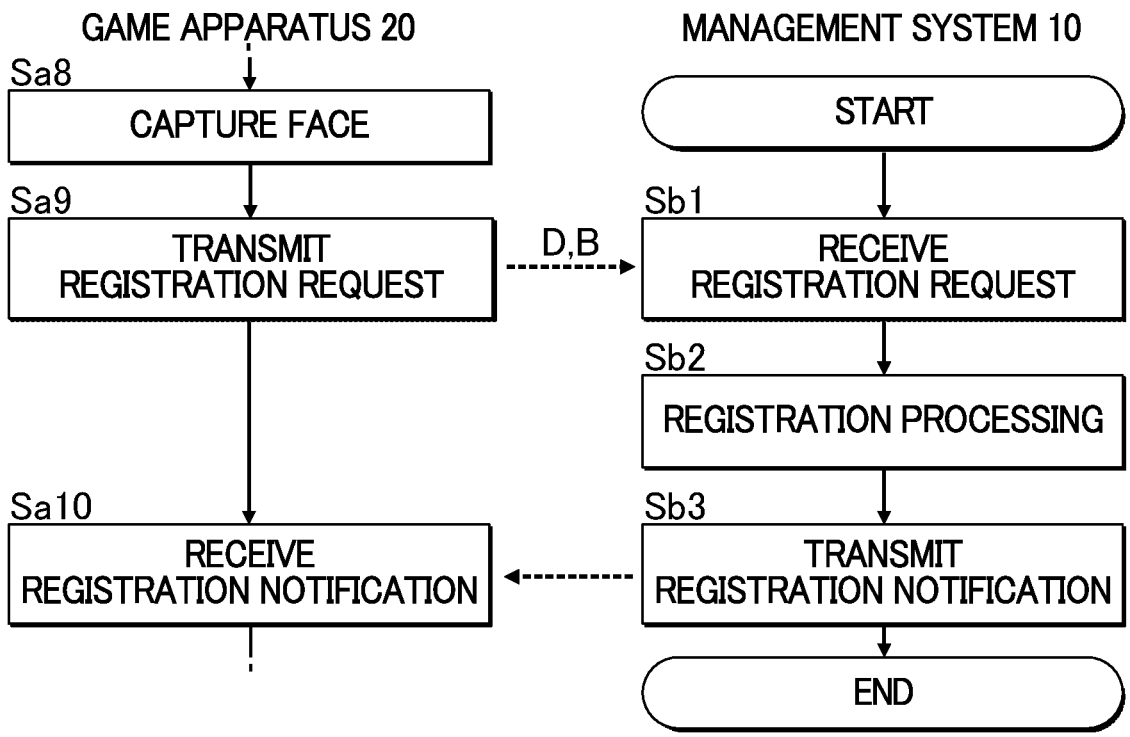
FIG. 6 is a flowchart showing a specific procedure of processing to register biometric information.

FIG. 6 is a flowchart showing a specific procedure of processing executed by the game apparatus 20 and the management system 10 to register the biometric information B. FIG. 6 shows part (Sa8 to Sa10) of the processing in FIG. 5B executed by the game apparatus 20 and processing (Sb1 to Sb3) executed by the management system 10.

As shown in FIG. 5B and FIG. 6, the controller 21 causes the image capturing device 27 to capture the face of the player to acquire the image data representative of the face of the player as the biometric information B (Sa8). The controller 21 may acquire the biometric information B if the player agrees to being photographed.

The controller 21 transmits a registration request from the communicator 23 to the management system 10 (Sa9). The registration request is a message to request the registration of the biometric information B. Specifically, the registration request includes the identification information D of the player acquired from the recording medium 30 and the biometric information B generated by the image capturing device 27.

The controller 11 of the management system 10 receives the registration request transmitted from the game apparatus 20, using the communicator 13 (Sb1). The controller 11 then executes the registration processing to register the biometric information B of the player (Sb2). Specifically, the controller 11 retrieves the registration data X corresponding to the identification information D included in the registration request from the storage device 12 to add the biometric information B, which is included in the registration request, to the registration data X. As will be understood from the above description, the controller 11 according to the first embodiment functions as a registration processor configured to execute the registration processing Sb2 to register the biometric information B.

Based on the registration processing Sb2 being executed in accordance with the above procedure, the controller 11 transmits a registration notification from the communicator 13 to the game apparatus 20 transmitted the registration request, (Sb3). The registration notification is a message to notify that the registration processing Sb2 has been properly executed.

The controller 21 of the game apparatus 20 receives the registration notification transmitted from the management system 10, using the communicator 23 (Sa10). Based on receiving the registration notification, as shown in FIG. 5A, the controller 21 receives the game data G corresponding to the identification information D acquired from the recording medium 30 from the management system 10 (Sa5) to progress the game in which the game data G is used (Sa6), as in the normal mode.

As described above, based on the preliminary mode being selected in a situation in which the biometric information B is not registered (Sa7: NO), the registration processing Sb2 is executed to newly register the biometric information B of the player. On the other hand, based on the preliminary mode being selected after the biometric information B is registered (Sa7: YES), the controller 21 executes processing to permit the player to play the game subject to success of the authentication processing Sc2 using the biometric information B.

Figure 7:
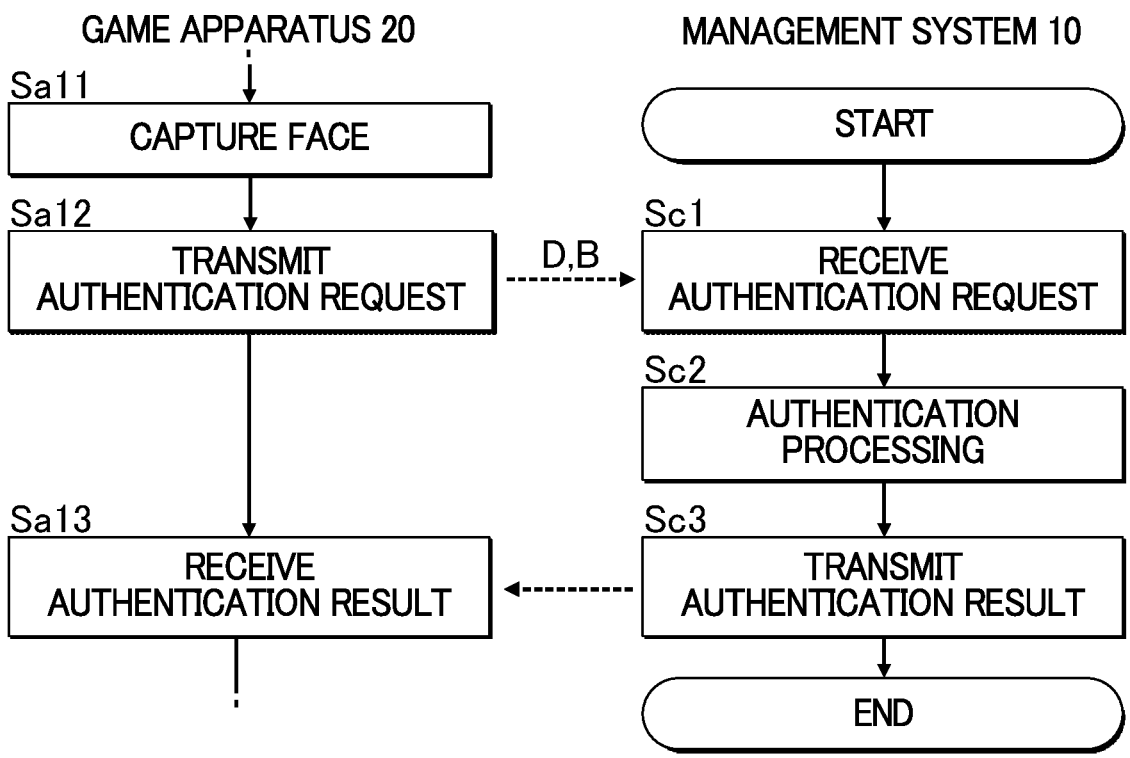
FIG. 7 is a flowchart showing a specific procedure of authentication processing.

FIG. 7 is a flowchart showing a specific procedure of processing executed by the game apparatus 20 and the management system 10 for the authentication processing Sc2 using the biometric information B. FIG. 7 shows part (Sa11 to Sa13) of the processing in FIG. 5B executed by the game apparatus 20 and processing (Sc1 to Sc3) executed by the management system 10.

As shown in FIGS. 5B and 7, the controller 21 causes the image capturing device 27 to capture the face of the player to acquire the image data representative of the face of the player as the biometric information B (Sa11). The controller 21 may acquire the biometric information B subject to the player agreeing to be photographed.

The controller 21 transmits an authentication request from the communicator 23 to the management system 10 (Sa12). The authentication request is a message to request authentication using the biometric information B. Specifically, the authentication request includes the identification information D of the player acquired from the recording medium 30 and the biometric information B generated by the image capturing device 27.

The controller 11 of the management system 10 receives the authentication request transmitted from the game apparatus 20, using the communicator 13 (Sc1). The controller 11 then executes the authentication processing using the biometric information B of the player (Sc2). Specifically, the controller 11 retrieves the registration data X corresponding to the identification information D included in the authentication request from the storage device 12 to determine the legitimacy of the player by comparing the biometric information B registered in the registration data X with the biometric information B included in the authentication request. In other words, the controller 11 confirms the legitimacy of the player based on the biometric information B in the authentication request matching or being similar to the biometric information B already registered (for example, when a degree of similarity between them is greater than a threshold value), whereas the controller 11 denies the legitimacy of the player based on the biometric information B in the authentication request not being similar to the biometric information B already registered (for example, when the degree of similarity between them is less than the threshold value). As will be understood from the above description, the controller 11 according to the first embodiment functions as an authentication processor configured to execute the authentication processing Sc2 using the biometric information B of the player.

Based on the registration processing Sc2 being executed in accordance with the above procedure, the controller 11 transmits an authentication result from the communicator 13 to the game apparatus 20 transmitted the authentication request, (Sc3). The authentication result is a message to notify a result (success/failure) of the authentication processing Sc2.

The controller 21 of the game apparatus 20 receives the authentication result transmitted from the management system 10, using the communicator 23 (Sa13). Then, as shown in FIG. 5B, the controller 21 determines whether the authentication result received from the management system 10 is successful (Sa14). Based on the authentication result being successful (Sa14: YES), the controller 21 permits the player to play the game. Specifically, as shown in FIG. 5A, the controller 21 receives the game data G corresponding to the identification information D acquired from the recording medium 30 from the management system 10 (Sa5) to progress the game in which the game data G is used (Sa6), as in the normal mode.

When the current player is different from a player who registered the biometric information B, the biometric information B registered in the registration data X is not similar to the biometric information B included in the authentication request. Therefore, the result of the authentication processing Sc2 has failed. Based on the authentication result being a failure (Sa14: NO), the controller 21 prohibits the player from playing the game (Sa15). Specifically, the controller 21 executes neither the acquisition of the game data G corresponding to the identification information D nor the progress of the game in which the game data G is used. In other words, the current player cannot play the game in the preliminary mode. As will be understood from the above description, the controller 21 of the game apparatus 20 functions as a game controller configured to permit the player to play the game subject to the success of the authentication processing Sc2 in the preliminary mode and permit the player to play the game without requiring the authentication processing Sc2 in the normal mode.

As described above, in the preliminary mode, the legitimacy of the player is ensured through the authentication processing Sc2 using the biometric information B of the player. Therefore, it is possible to effectively reduce fraudulent substitution in which a person different from the legitimate player plays the game instead of the legitimate player in the competitive event. On the other hand, in the normal mode, the player is permitted to play the game without requiring the registration processing Sb2 and the authentication processing Sc2. Therefore, it is possible to satisfy a demand for a player who wishes to play a game easily without requiring the registration processing Sb2 of the biometric information B and the authentication processing Sc2 using the biometric information B.

In the first embodiment, based on the biometric information B of the player not being registered (Sa7: NO), the authentication processing Sb2 to register the biometric information B for use in the authentication processing Sc2 is executed. Therefore, there is an advantage in that a player for whom biometric information B has not been registered can easily register the biometric information B of the player.

Figure 8:
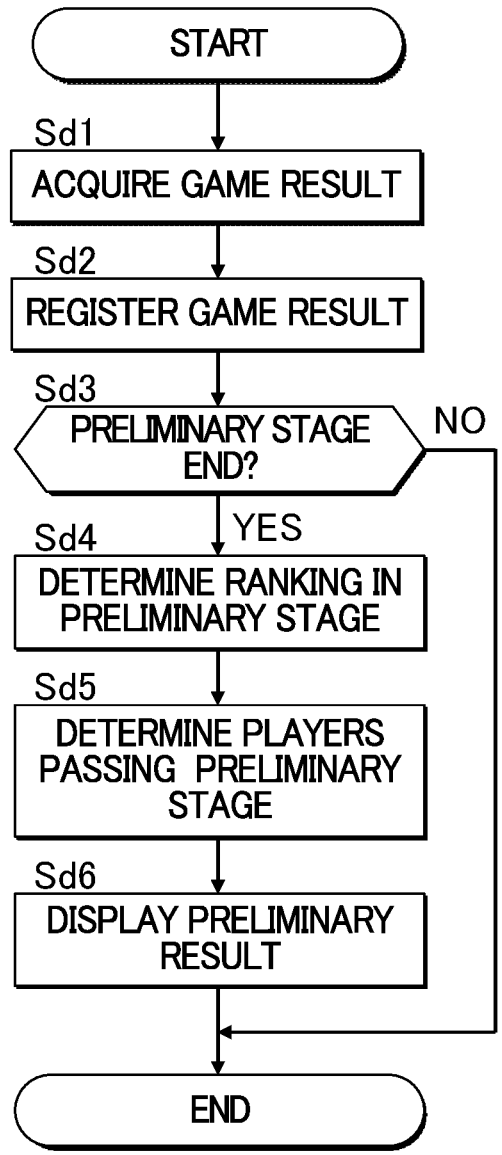
FIG. 8 is a flowchart showing a specific procedure of processing executed to manage a ranking of each player in a competitive event.

FIG. 8 is a flowchart showing a specific procedure of processing in which the management system 10 manages a ranking of each player in the preliminary stage in the competitive event. The processing in FIG. 8 is executed in parallel with the processing shown in FIGS. 6 and 7 in response to an interruption that occurs at predetermined time intervals.

The controller 11 of the management system 10 acquires a result of the game played by the registered player in the preliminary mode (hereinafter referred to as a "game result") from each game apparatus 20 (Sd1). For example, the controller 11 receives the game result, which has been transmitted from each game apparatus 20 in response to the end of the game, using the communicator 13. The game result is, for example, a score acquired by the player in the game or the player's win or loss in the competitive game. The controller 11 registers the game result of each player in the registration data X for the player (Sd2). As described above, the game result in the preliminary mode is collected for each of the registered players.

The controller 11 determines whether the preliminary stage of the competitive event has ended (Sd3). The condition for the end of the preliminary stage is freely selected. For example, it is determined that the preliminary stage has ended when a predetermined duration of time set before the start of the final stage elapses.

Based on the preliminary stage having ended (Sd3: YES), the controller 11 aggregates the game result for each of the registered players to determine the rankings for the plurality of players in the preliminary stage (hereinafter referred to as "preliminary ranking") (Sd4). For example, the controller 11 determines the preliminary rank (ranking) in accordance with the score obtained by each player in the game in a preliminary mode or the number of wins of each player in a competitive game in the preliminary mode. As will be understood from the above description, the controller 11 functions as a ranking determiner configured to determine the ranking of each of a plurality of players.

The controller 11 determines a predetermined number of players to progress to the final stage in accordance with their preliminary ranking (Sd5). For example, the predetermined number of players are selected in descending order of their preliminary ranking Specifically, the controller 11 registers data indicative of progressing to the final in the registration data X of each player who has been determined to progress to the final stage. Based on the display of the results of the preliminary stage being indicated from a player by operating the operation device 25, the game apparatus 20 requests the display of the results of the preliminary stage from the management system 10. In response to the request from each game apparatus 20, the controller 11 causes the display 24 of the game apparatus 20 to display the results of the preliminary stage (Sd6). For example, a list of each player's name and preliminary rank is displayed on the display 24. On the other hand, based on the preliminary stage having not ended (Sd3: NO), the determination of the ranking (Sd4), the selection of players (Sd5), and the display of results (Sd6) are not executed.

After the preliminary stage described above, the final stage is held in which a plurality of players who passed the preliminary stage compete against each other. In the final stage, the legitimacy of each player is confirmed, for example, by an operator of the competitive event checking documents, etc., submitted by each player. Therefore, in the final stage in the first embodiment, the authentication processing Sc2 using the biometric information B is not executed. In other words, in the final stage, each player plays the game in the normal mode in which the registration processing Sb2 and the authentication processing Sc2 are not executed.

In the final stage, game apparatuses 20 are used that are different from the game apparatuses 20 used in the preliminary stage. For example, in the preliminary stage, a plurality of game apparatuses 20 in an amusement facility is used, whereas in the final stage, a plurality of game apparatuses 20 installed in a venue different from the amusement facility is used. However, the plurality of game apparatuses 20 used in the preliminary stage may be used in the final stage.

In the above description, the preliminary ranking is determined based on the preliminary stage having ended (Sd3: YES), but a provisional preliminary ranking (i.e., an interim progress report) may be determined at an appropriate point of time during the preliminary stage in the same manner. Based on referring to the provisional preliminary ranking, the final ranking can be predicted.

Second Embodiment

A second embodiment according to the present disclosure will be described. In each example illustrated below, elements having functions identical to those in the first embodiment are denoted by like reference signs as used in the descriptions in the first embodiment, and detailed explanations of such elements are omitted, as appropriate.

The game apparatus 20 according to the second embodiment operates in an operation mode that is one of the normal mode, the preliminary mode, and a final mode. The operation in the normal mode and the operation in the preliminary mode are the same as in the first embodiment. The final mode is an operation mode used in the final stage in which a plurality of players who passed the preliminary stage competes against each other. The final mode is an example of a "third mode."

Figure 9A:
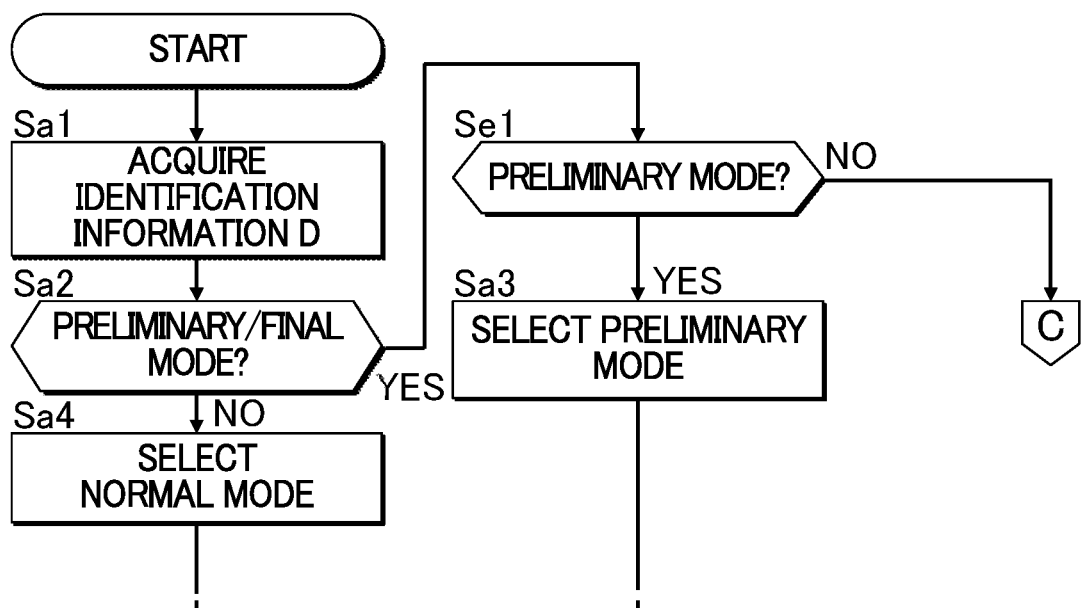
FIG. 9A is a flowchart showing a specific procedure of a part of processing executed by the game apparatus and the management system that are according to a second embodiment.
Figure 9B:
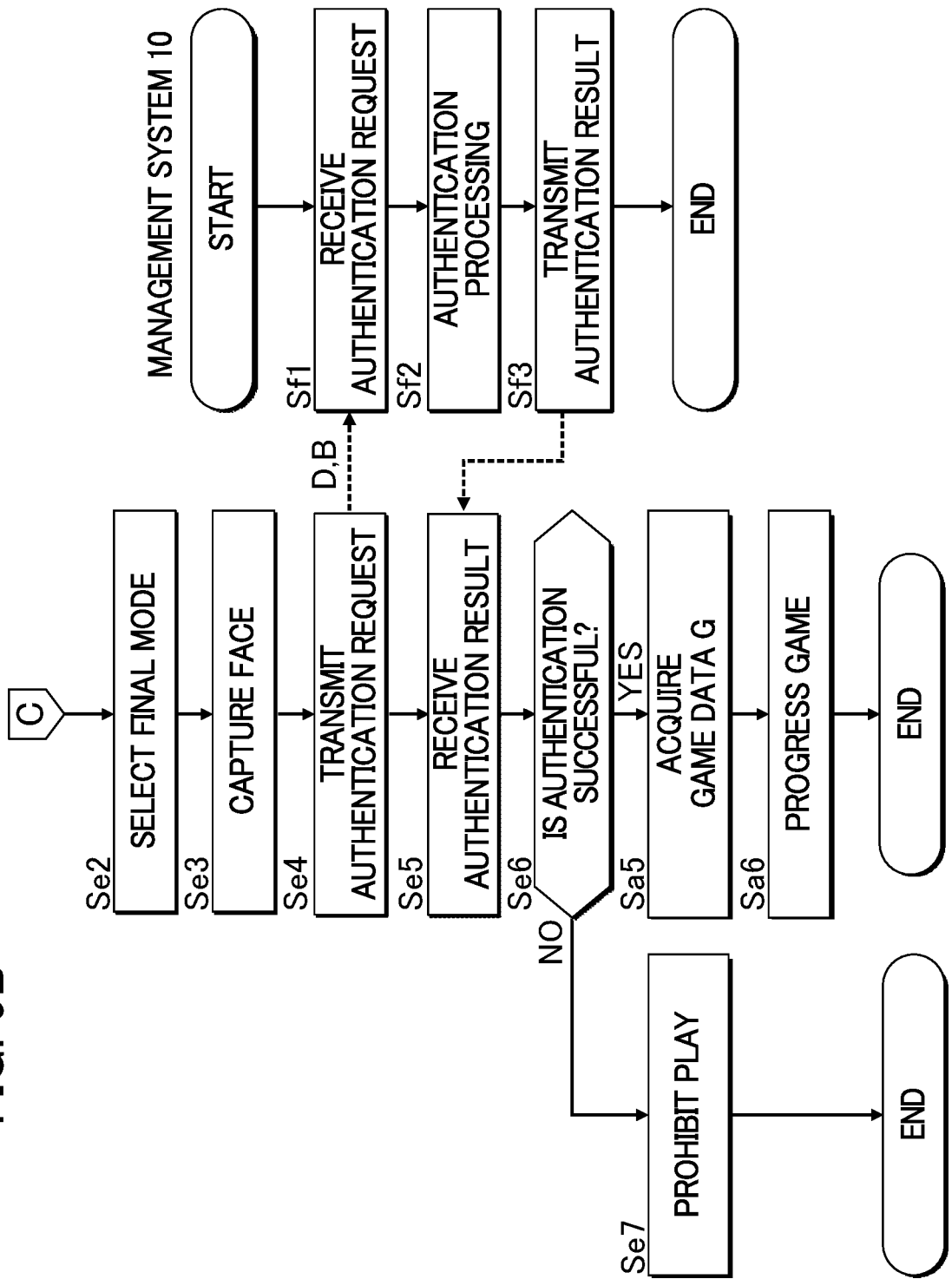
FIG. 9B a flowchart showing a specific procedure of another part of processing executed by the game apparatus and the management system that are according to the second embodiment.

FIGS. 9A and 9B each are a flowchart showing a specific procedure of processing executed by the game apparatus 20 and the management system 10 that are according to the second embodiment. As in the first embodiment, based on the identification information D being acquired from the recording medium 30 (Sa1), the controller 21 of the game apparatus 20 determines whether the preliminary mode or the final mode is indicated by the player (Sa2).

Based on either the preliminary mode or the final mode not being indicated by the player (Sa2: NO), the controller 21 selects the normal mode as the operation mode (Sa4). The specific operation (Sa5, Sa6) in the normal mode is the same as in the first embodiment.

Based on the preliminary mode or the final mode being indicated by the player (Sa2: YES), the controller 21 determines whether the preliminary mode is indicated by the player (Se1). Based on the preliminary mode being indicated by the player (Se1: YES), the controller 21 selects the preliminary mode as the operation mode (Sa3). The specific operation (Sa7-Sa15) in the preliminary mode is the same as in the first embodiment.

Based on the final mode being indicated by the player (Se1: NO), the controller 21 selects the final mode as the operating mode, as shown in FIG. 9B (Se2). As shown above, the controller 21 according to the second embodiment selects the normal mode based on either the preliminary mode or the final mode not being indicated by the player. In other words, as in the first embodiment, there is no need for the player to explicitly indicate the normal mode. As will be understood from the above description, the controller 21 according to the second embodiment functions as a mode selector configured to select one of a plurality of operation modes including the normal mode, the preliminary mode, and the final mode. The preliminary mode or the final mode may be selected automatically by the controller 21, in spite of the indication from the player. For example, the controller 21 selects the final mode during a period in which the final stage is conducted, whereas the controller 21 selects the preliminary mode during a period in which the preliminary stage is conducted.

Based on the final mode being selected (Se2), the controller 21 causes the image capturing device 27 to capture the face of the player to acquire the image data representative of the face of the player as the biometric information B (Se3). The controller 21 may acquire the biometric information B subject to the player agreeing to be photographed. The registration processing Sb2 for the players progressing to the final stage is not executed in the final mode because the biometric information B of the players has already been registered through the registration processing Sb2 in the preliminary stage. However, the registration processing Sb2 may be executed again in the final mode.

The controller 21 transmits the authentication request from the communicator 23 to the management system 10 (Se4). The authentication request includes the identification information D of the player acquired from the recording medium 30 and the biometric information B generated by the image capturing device 27. The controller 11 of the management system 10 receives the authentication request transmitted from the game apparatus 20, using the communicator 13 (Sf1). The controller 11 then executes the authentication processing using the biometric information B of the player (Sf2). Specifically, as in the authentication processing Sc2 in the first embodiment, the controller 11 retrieves registration data X corresponding to the identification information D included in the authentication request from the storage device 12 to determine the legitimacy of the player by comparing the biometric information B registered in the registration data X with the biometric information B included in the authentication request.

Based on the authentication processing Sf2 being executed, the controller 11 transmits an authentication result to the game apparatus 20, which transmitted the authentication request, from the communicator 13 (Sf3). The controller 21 of the game apparatus 20 receives the authentication result transmitted from the management system 10, using the communicator 23 (Se5). Then controller 21 determines whether the authentication result received from the management system 10 is successful (Se6). Based on the authentication result being successful (Se6: YES), the controller 21 permits the player to play the game. Specifically, as in the normal mode, the controller 21 receives the game data G corresponding to the identification information D acquired from the recording medium 30 from the management system 10 (Sa5) to progress the game in which the game data G is used (Sa6). As described above, the controller 21 according to the second embodiment progresses the game, which is played in the final mode by each of the plurality of players selected in accordance with the results of the game in the preliminary mode.

When the current player is different from a player having passed the preliminary stage, the biometric information B registered in the registration data X is not similar to the biometric information B included in the authentication request. Therefore, the result of the authentication processing Sf2 is a failure. Based on the authentication result being a failure (Se6: NO), the controller 21 prohibits the player from playing the game (Se7). The controller 21, for example, causes the display 24 to display an image indicating that the legitimacy of the player cannot be authenticated.

The second embodiment realizes the same effects as in the first embodiment. In the final mode in the second embodiment, the legitimacy of the player is ensured through the authentication processing Sf2 using the biometric information B of the player. Therefore, it is possible to effectively reduce fraudulent substitution in which a person different from a legitimate player plays the game instead of the legitimate player in the final stage in the competitive event. In addition, the biometric information B used in the authentication processing Sc2 in the preliminary mode is used in the authentication processing Sf2 in the final mode. Therefore, the processing load for registration of the biometric information B is reduced compared to a configuration in which the biometric information B of a player is registered for each of the preliminary stage and the final stage of the competitive event, for example.

Third Embodiment

Figure 10:
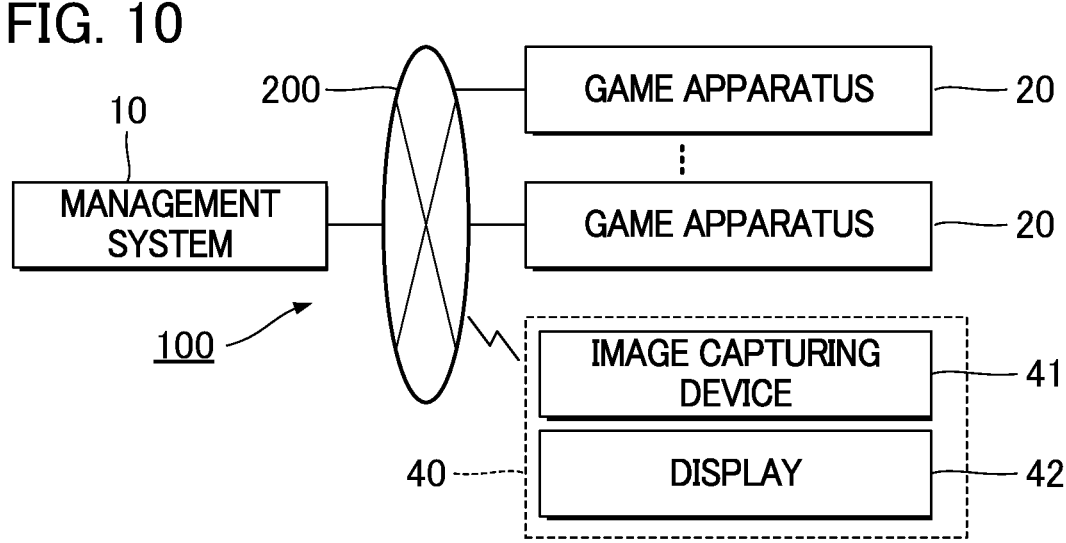
FIG. 10 is a block diagram showing a configuration of the game system according to a third embodiment.

FIG. 10 is a block diagram showing a configuration of the game system 100 according to a third embodiment. As shown in FIG. 10, the operator of the competitive event using the game system 100 has a terminal device 40. The terminal device 40 is an information terminal device such as a smartphone and a tablet. The terminal device 40 is used to authenticate the legitimacy of each player participating in the final stage.

As shown in FIG. 10, the terminal device 40 includes an image capturing device 41 and a display 42. The image capturing device 41 is an image input device (biometric information generator) to generate the biometric information B by capturing the face of the player, as in the image capturing device 27 in the first embodiment. The display 42 displays images.

Figure 11:
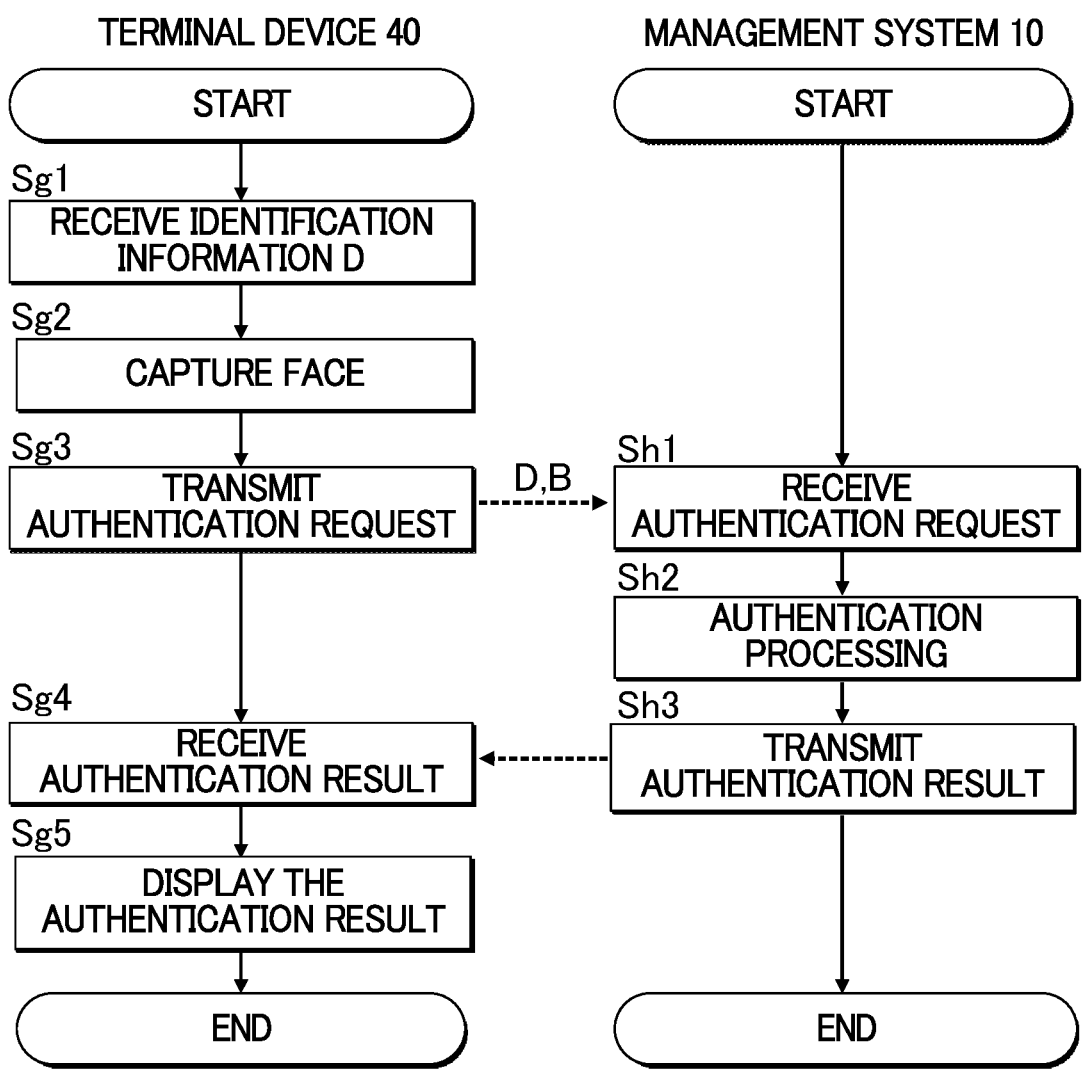
FIG. 11 is a flowchart showing a specific procedure of processing executed by a terminal device according to the third embodiment.

FIG. 11 is a flowchart showing a specific procedure of processing executed by the management system 10 and the terminal device 40 that are according to the third embodiment. The processing in FIG. 11 is executed for each player to participate in the final stage before the start of the final stage. For example, the processing in FIG. 11 starts in response to an indication from the operator to the terminal device 40.

The operator or the player inputs the identification information D of the player to the terminal device 40. The terminal device 40 receives the input of the identification information D (Sg1). In addition, in response to indication from the operator, the image capturing device 41 of the terminal device 40 captures the face of the player to generate the biometric information B (Sg2). The terminal device 40 transmits the authentication request to the management system 10 (Sg3). The authentication request includes the identification information D input to the terminal device 40 and the biometric information B generated by the image capturing device 41.

The controller 11 of the management system 10 receives the authentication request transmitted from the terminal device 40, using the communicator 13 (Sh1). The controller 11 then executes the authentication processing using the biometric information B of the player (Sh2). Specifically, as in the authentication processing Sc2 in the first embodiment, the controller 11 retrieves registration data X corresponding to the identification information D included in the authentication request from the storage device 12 to determine the legitimacy of the player by comparing the biometric information B registered in the registration data X with the biometric information B included in the authentication request. The controller 11 transmits an authentication result regarding the authentication processing Sh2 from the communicator 13 to the terminal device 40 transmitted the authentication request (Sh3).

The terminal device 40 receives the authentication result transmitted from the management system 10 (Sg4) to display the authentication result on the display 42 (Sg5). The operator confirms the legitimacy of the player by viewing an image displayed on the display 42. The operator permits the player having success in the authentication processing Sh2 to play the game, whereas the operator prohibits a player having failed in the authentication processing Sh2 from playing the game. For example, the operator disqualifies a player having failed in the authentication processing Sh2.

The third embodiment realizes the same effects as in the first embodiment. In the final mode in the third embodiment, the legitimacy of the player is ensured through the authentication processing Sh2 using the biometric information B of the player. Therefore, it is possible to effectively reduce fraudulent substitution in which a person different from a legitimate player who participated in the preliminary stage plays the game instead of the legitimate player in the final stage in a competitive event. In other words, it is possible to reduce fraudulent substitution in which a person different from the player who will participate in the final stage plays the game in the preliminary stage instead of the player. In addition, the biometric information B used in the authentication processing Sc2 in the preliminary mode is used in the authentication processing Sh2 in the final mode. Therefore, the processing load for registration of the biometric information B is reduced compared to a configuration in which the biometric information B of the player is registered for each of the preliminary stage and the final stage of the competitive event, for example.

Fourth Embodiment

Figure 12:
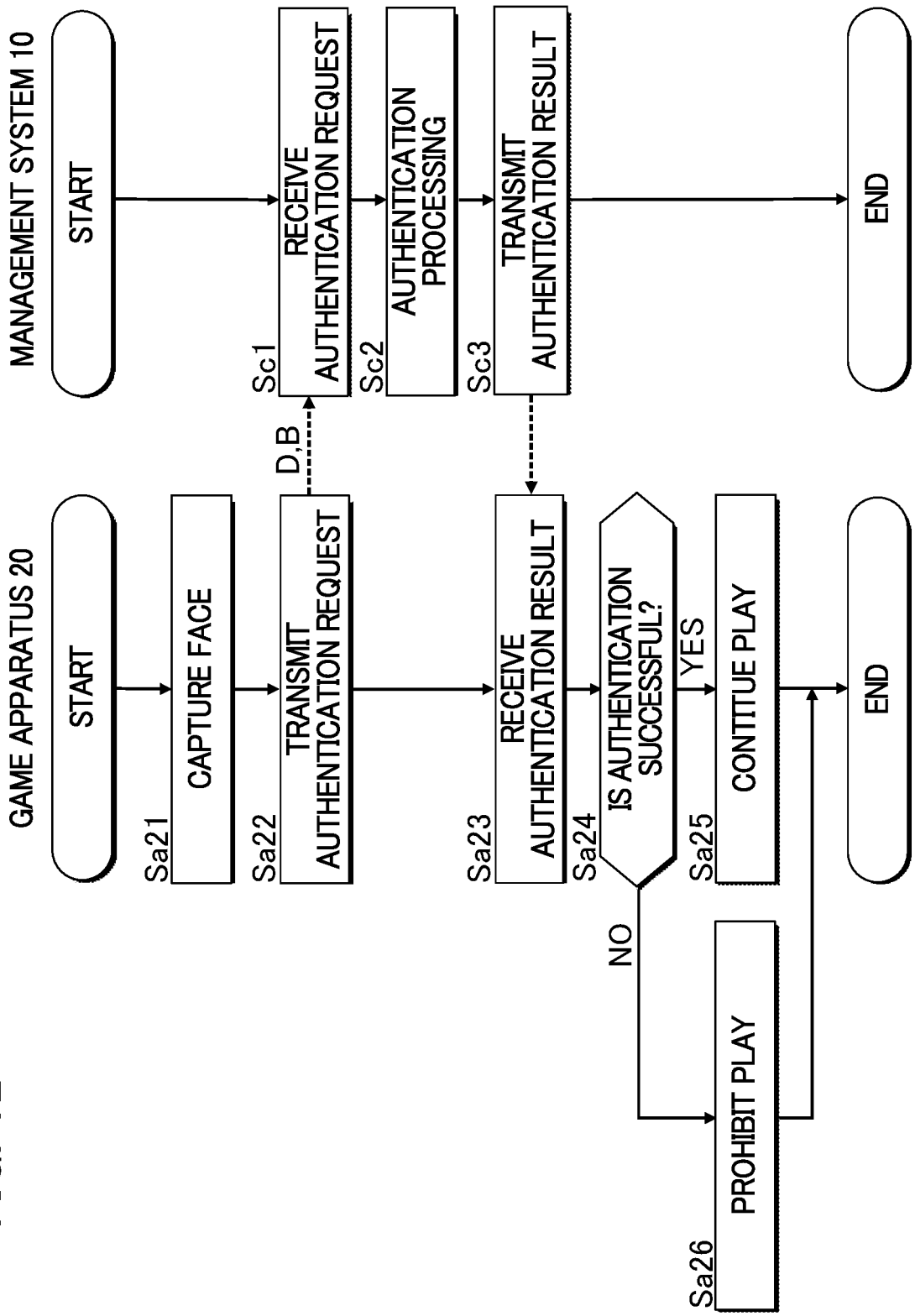
FIG. 12 is a flowchart showing a specific procedure of processing executed in parallel with progressing of a game in a fourth embodiment.

In a fourth embodiment, when the preliminary mode is selected, the processing in FIG. 12 is repeated in parallel with progressing of the game by the game apparatus 20. For example, in a situation in which the preliminary mode is selected (Sa3), the controller 21 executes the processing in FIG. 12 in response to an interrupt that occurs at predetermined time intervals. The processing in FIG. 12 is processing to permit a continuation of the game subject to success of the authentication processing Sc2 using the biometric information B.

The controller 21 causes the image capturing device 27 to capture the face the player to acquire the image data representative of the face of the player as the biometric information B (Sa21). The controller 21 transmits the authentication request, which includes both the identification information D of the player acquired from the recording medium 30 and the biometric information B generated by the image capturing device 27, from the communicator 23 to the management system 10 (Sa22).

The operation of the management system 10 upon receiving the authentication request is the same as in the first embodiment. In other words, the controller 11 of the management system 10 receives the authentication request using the communicator 13 (Sc1) to execute the authentication processing Sc2 using the biometric information B in the authentication request. The controller 11 then transmits the authentication result from the communicator 13 to the game apparatus 20 (Sc3). As will be understood from the above description, the controller 11 according to the fourth embodiment repeats the authentication processing Sc2 in parallel with the progress of the game by the game apparatus 20.

The controller 21 of the game apparatus 20 receives the authentication result transmitted from the management system 10, using the communicator 23 (Sa23). Then controller 21 determines whether the authentication result received from the management system 10 is successful (Sa24). When the player having already succeeded in the authentication processing Sc2 continues to play the game, the authentication result is successful. Based on the authentication result being successful (Sa24: YES), the controller 21 continues the progress of the game (Sa25).

On the other hand, when a player is replaced by another person at a point in the progress of the game after the authentication processing Sc2 succeeds, the result of the authentication processing Sc2 has failed. Based on the authentication result having failed (Sa24: NO), the controller 21 prohibits the play of the game (Sa26). For example, the controller 21 stops the progress of the game.

The fourth embodiment realizes the same effects as in the first embodiment. In the fourth embodiment, the authentication processing Sc2 is repeated in parallel with the progress of the game in the preliminary mode. Therefore, it is possible to effectively reduce fraudulent substitution in which the player is replaced by another person at a point in the progress of the game.

In the above explanation, the configuration in which the authentication processing Sc2 is repeated in the preliminary mode is shown as an example, but the authentication processing Sf2 may be repeated in parallel with the progress of the game in the final mode in the same way. However, since the final stage is conducted in a situation in which many spectators are watching the game, it is unlikely that the player will be replaced by another person at a point in the progress of the game. Therefore, the configuration of the fourth embodiment, in which the authentication processing Sc2 is repeated, is particularly effective for the preliminary stage which is conducted in a situation in which there are few spectators.

In a competitive event in which a player plays the game multiple times in the preliminary stage, it is relatively easy to ensure the legitimacy of the player because the player is authenticated for each play. On the other hand, when each player is authenticated only at the start of the game in the competitive event in which each player plays the game only once in the preliminary stage, the legitimacy of each player is authenticated only once for each player in the preliminary stage. In view of the circumstances described above, the configuration of the fourth embodiment in which the authentication processing Sf2 is executed in parallel with the progress of the game is particularly effective in the competitive event in which each player plays the game only once in the preliminary stage.

Fifth Embodiment

The game system 100 according to a fifth embodiment provides a game to be played by a team consisting of a plurality of players. In other words, the competitive event is a game event in which a plurality of teams compete against each other to determine a winner or a ranking Each of the plurality of players constituting each team plays the game using, for example, one game apparatus 20 in turn. However, the plurality of players constituting the team may play the game in parallel using different game apparatuses 20.

The biometric information B in the fifth embodiment is image data representative of the image of the face of each of the plurality of players constituting one team. For example, a single piece of image data, which is generated by the image capturing device 27 capturing an area including the faces of all the players in a situation in which the plurality of players is present, is generated as the biometric information B. The biometric information B may include a plurality of pieces of image data generated by capturing the faces of different players. The biometric information B described above is registered in the registration data X through the registration processing Sb2 as in the first embodiment to compare the biometric information B described above with the biometric information B, which is already registered, in the authentication processing Sc2.

In the authentication processing Sc2 in the fifth embodiment, the legitimacy of each of the plurality of players identified by the biometric information B is authenticated by comparing each of the plurality of players included in the biometric information B with each player identified by the biometric information B already registered. Specifically, for each of the plurality of players represented by the biometric information B in the authentication request, the controller 21 of the management system 10 confirms the legitimacy of the player based on the player matching or being similar to one of the players represented by the biometric information B already registered, and the controller 21 denies the legitimacy of the player based on the player not being similar to any players represented by the biometric information B already registered. When the legitimacies of all the players constituting one team are confirmed, the authentication processing Sc2 becomes successful.

The fifth embodiment realizes the same effects as in the first embodiment. In addition, the fifth embodiment can reduce fraudulent substitution in which the player is replaced by another person in the game to be played by a team consisting of a plurality of players. The above description focuses on the authentication processing Sc2 in the first embodiment. However, the fifth embodiment using the biometric information B regarding a plurality of players is also applicable to the authentication processing Sf2 in the second embodiment and the authentication processing Sh2 in the third embodiment.

In the above explanation, the authentication processing Sc2 is determined to be successful when the legitimacies of all players constituting a team are confirmed; however the authentication processing Sc2 may be confirmed when the legitimacies of some players, the number of which is greater than a predetermined number, from among all the players constituting a team are confirmed. For example, the authentication processing Sc2 may also be determined to be successful based on some of the players on the team, which is constituted at the time of execution of the registration processing Sb2, being absent, or based on the number of players on the team being increased compared to the number of players on the team that is constituted at the time of execution of the registration processing Sb2. It is also possible to assume a configuration in which the success of the authentication processing Sc2 is required for one or more specific players on the team (that is, the core members), whereas the success of the authentication processing Sc2 is not required for other players.

Modifications

Each of the embodiments described above can be variously modified. Specific modifications that may be applied to the above embodiments are described below. Two or more modifications freely selected from the following descriptions may be combined as long as no conflict arises from such a combination.

(1) Amusement facilities are equipped with a management device configured to manage game mediums used to play the game. A game medium is a tangible or intangible value medium used for players to play the game. The tangible game medium is, for example, a token coin (a medal), a coin, a bill, or a ticket. The intangible game medium is, for example, an electronic medal, a credit or a point. Electronic data indicative of a quantity of the intangible game mediums is stored on a recording medium such as an IC card. The management device is a computer system that manages deposits or withdrawals of the game mediums. The management device described above may be equipped with the functions of the management system 10 according to each embodiment described above.

(2) In each of the above embodiments, the face of the player is captured by the image capturing device 27 installed in the game apparatus 20; however the face of the player may be captured by an image capturing device installed separately from the game apparatus 20. For example, the face of the player may be captured by an imaging capturing device installed in the aforementioned management device that manages the game mediums. As will be understood from the above description, it is not necessary that an element (biometric information generator), which generates the biometric information B of the player, be installed in the game apparatus 20.

(3) In each of the above embodiments, a configuration in which playing the game is prohibited based on the authentication processing (Sc2, Sf2, Sh2) having failed is shown as an example; however the playing the game need not be prohibited immediately in response to a single failure in the authentication processing. For example, the playing the game may not be prohibited based on the authentication processing having failed only once, whereas the playing the game may be prohibited based on the authentication processing having failed multiple times. In addition, it is also possible to assume a configuration that records an occurrence of cheating regarding playing the game based on failure in the authentication processing, or a configuration that displays a fact that cheating is carried out on the display 24 based on failure in the authentication processing. In other words, the playing the game may not be prohibited. In a configuration that records the failure of the authentication processing, the record may be referred to at the stage of determining whether each player passes the preliminary stage.

(4) In each of the above embodiments, the authentication processing (Sc2, Sf2, Sh2) is described that uses the identification information D in addition to the biometric information B of the player; however the use of the identification information D in the authentication processing may be omitted. For example, the biometric information B of the player to be authenticated is compared with the biometric information B of each of the plurality of players registered through the registration processing Sb2, and when the biometric information B similar to the biometric information B of the player to be authenticated corresponds to one of the plurality of pieces of biometric information B already registered, the legitimacy of the player may be confirmed. In the above processing, the identification information D is not required.

(5) In each of the above embodiments, face authentication using the biometric information B representative of the face of the player is described; however the type of biometric information B is not limited to the above example. For example, as the authentication processing (Sc2, Sf2, Sh2) in each of the above embodiments, freely selected biometric authentication may be used, such as iris authentication using a iris pattern of the player as the biometric information B, fingerprint authentication using a fingerprint pattern of the player as the biometric information B, vein authentication using a vein pattern of the player as the biometric information B, and voice authentication using a voiceprint pattern of the player as the biometric information B.

(6) In each of the above embodiments, the image data representative of the image of the face of the player is described as the biometric information B; however, the type of data concerning the biometric information B may be freely selected. For example, feature points data representative of feature points extracted from the image of the face of the player may be used as the biometric information B.

(7) In each of the above embodiments, the management system 10 executes the registration processing Sb2, the authentication processing (Sc2, Sf2, Sh2), and the determination of the preliminary ranking (Sd3); however the management system 10 may be constituted by a plurality of apparatuses executing each processing described above. In other words, the functions of the management system 10 described in each of the above embodiments are executed by a plurality of apparatuses configured separately from each other. Some or all of the management system 10 may be installed in each amusement facility. Some or all of the functions of the management system 10 may be installed in the game apparatus 20. As will be understood from the above description, as long as each function is realized in the game system 100 as a whole, in the present disclosure, each function may be installed any one apparatus of the game system 100, and each function may be in a single apparatus or be distributed among a plurality of apparatuses.

(8) In each of the above embodiments, a case is described in which the player plays the same type of game in the competitive event (preliminary mode or final mode) and in the non-competitive event (normal mode); however, the type of game to be played in the competitive event may be different from the type of game to be played in the non-competitive event. Similarly, the type of game to be played in the preliminary stage may be different from the type of game to be played in the final stage. In each of the above embodiments, a case is described in which the competitive event includes the preliminary stage and the final stage; however, the distinction between the preliminary stage and the final stage is not required. The present disclosure is also applicable to a competitive event in which there is no distinction between the preliminary stage and the final stage.

(9) The functions of the game system 100 according to each of the above embodiments are realized by a program. The program may be provided in a form stored in a computer-readable recording medium and installed in a computer. The recording medium is, for example, a non-transitory recording medium, and although an optical recording medium (an optical disk) such as a compact disk read-only memory (CD-ROM) is one example of the recording medium, the recording medium may also include a recording medium of any known form, such as a semiconductor recording medium or a magnetic recording medium. The non-transitory recording medium includes any recording medium except for a transitory, propagating signal and does not exclude a volatile recording medium. The non-transitory recording medium may be a storage apparatus in a distribution apparatus that stores a computer program for distribution via a communication network.

Supplemental Notes

For example, the present disclosure is understood as follows based on the above descriptions. In the following descriptions, reference signs in the drawings are denoted in parentheses for convenience in order to facilitate understanding of each aspect, but the present disclosure is not limited to the aspects illustrated in the drawings.

Supplemental Note 1

A game system (100) according to a one aspect (supplemental note 1) of the present disclosure includes: one or more memories (12, 22) configured to store instructions; and one or more processors (11, 21) communicatively connected to the one or more memories (12, 22) and configured to execute the instructions to: select one of a plurality of modes including a first mode and a second mode; execute authentication processing using biometric information (B) of a player; permit the player to play a game without requiring the authentication processing in the first mode; and permit the player to play the game subject to success of the authentication processing in the second mode.

According to the aspect described above, in the second mode, the legitimacy of the player (for example, the fact that the player is a person registered in advance) is ensured through the authentication processing using the biometric information (B) of the player. Therefore, for example in a competitive event in which a plurality of players competes against each other, it is possible to effectively reduce fraudulent substitution in which a person different from a legitimate player plays a game instead of the legitimate player. On the other hand, in the first mode, the player is permitted to play the game without authentication processing. Therefore, it is possible to satisfy a demand for a player who wishes to play a game easily without requiring registration processing of the biometric information (B) and authentication processing using the biometric information (B).

"The biometric information (B)" is information representative of the biometric features of the player. An example of "the biometric information (B)" is information such as an image of the face of the player, a vein pattern of the player, a fingerprint pattern of the player, an iris pattern of the player, and a voiceprint pattern of the player, or feature values extracted from the information.

A typical example of a configuration "to permit the player to play the game subject to success of the authentication processing" is a configuration to: permit the player to play the game based on the authentication processing being a success; and prohibit the player from playing the game based on the authentication processing being a failure. However, it is not necessary that playing the game be immediately prohibited based on a single failure in the authentication processing. For example, the playing the game may be not prohibited based on a single failure in the authentication processing, and the playing the game may be prohibited based on a plurality of failures in the authentication processing. In addition, it is also possible to assume a configuration to record an occurrence of cheating regarding the playing the game based on a failure in the authentication processing, or a configuration to display a fact that cheating is carried out based on a failure in the authentication processing. In other words, playing the game may not be prohibited.

"To permit the player to play a game without requiring the authentication processing" means that the authentication processing using the biometric information (B) is not a condition for playing the game. Therefore, a configuration is not excluded in which success of simple authentication processing that does not use the biometric information (B) is a condition for playing the game in the first mode.

Supplemental Note 2

In the game system (100) according to a specific example (supplemental note 2) of the supplemental note 1, the one or more processors (11, 21) are further configured to, in a case in which the biometric information (B) of the player is not registered in the second mode, execute registration processing to register the biometric information (B) for use in the authentication processing. According to the aspect described above, a player of which biometric information (B) has not been registered can register the biometric information (B).

Supplemental Note 3

In a specific example (supplemental note 3) of the supplemental note 1 or 2, in selecting one of the plurality of modes, the one or more processors (11, 21) are configured to: select the second mode based on the second mode being indicated; and select the first mode based on the second mode not being indicated. According to the aspect described above, in a situation that is not a special situation such as a competitive event, the first mode in which the authentication processing is not required is selected by the fact that the second mode is not indicated. Therefore, the efforts for a large number of players, who do not participate in a competitive event, to select the operation mode, is reduced.

Supplemental Note 4

In a specific example (supplemental note 4) of any one of the supplemental notes 1 to 3, in the executing the authentication processing, the one or more processors (11, 21) are configured to repeat the authentication processing in parallel with progressing of the game in the second mode. According to the aspect described above, since the authentication processing is repeated in parallel with the progressing of the game in the second mode, it is possible to effectively reduce cheating in which the player has another person play the game instead of the player.

Supplemental Note 5

In a specific example (supplemental note 5) of any one of the supplemental notes 1 to 4, the plurality of modes further includes a third mode, and the one or more processors (11, 21) are configured to, in the third mode, progress the game played by each of a plurality of players selected in accordance with results of the game in the second mode. According to the aspect described above, the plurality of players selected in accordance with the results of the game in the second mode plays the game in the third mode. Therefore, in a competitive event, the second mode is preferably a preliminary stage in which a plurality of players is selected, and the third mode is preferably a final stage in which the plurality of players selected in the preliminary stage competes against each other, for example.

Supplemental Note 6

In a specific example (supplemental note 6) of the supplemental note 5, the one or more processors (11, 21) are configured to, in the third mode, permit each of the plurality of players to play the game subject to success of the authentication processing. According to the aspect described above, in the third mode, the legitimacy of the player is ensured through the authentication processing using the biometric information (B) of the player. Therefore, for example, it is possible to effectively reduce fraudulent substitution in which a person different from a legitimate player plays the game instead of the legitimate player in a final stage in a competitive event. In addition, since the biometric information (B) used in the authentication processing in the second mode is used in the authentication processing in the third mode, the processing load for registration of the biometric information (B) is reduced compared to a configuration in which the biometric information (B) of the player is registered for each of the preliminary stage and the final stage of the competitive event, for example.

Supplemental Note 7

In a specific example (supplemental note 7) of any one of the supplemental notes 1 to 5, in executing the authentication processing, the one or more processors (11, 21) are configured to execute the authentication processing in response to a request from a terminal device (40) communicable with the game system (100). According to the aspect described above, for example, the legitimacy of the player in a final stage in a competitive event is ensured through the authentication processing executed in response to the request from the terminal device (40). Therefore, for example, it is possible to effectively reduce fraudulent substitution in which a person different from a legitimate player plays the game instead of the legitimate player in the final stage in the competitive event. In addition, since the biometric information (B) used in the authentication processing in the second mode is used in the authentication processing in the third mode, the processing load for registration of the biometric information (B) is reduced compared to a configuration in which the biometric information (B) of the player is registered for each of the preliminary stage and the final stage of the competitive event, for example.

Supplemental Note 8

In a specific example (supplemental note 8) of any one of the supplemental notes 1 to 4, the game is a game to be played by a team consisting of a plurality of players including the player, and in the executing the authentication processing, the one or more processors (11, 21) are configured to execute the authentication processing using biometric information (B) of the plurality of players. According to the aspect described above, it is possible to reduce fraudulent substitution in which a player has another person play the game to be played on a team consisting of a plurality of players, instead of the player.

Regarding "the authentication processing using biometric information (B) of the plurality of players," authentication of the legitimacies of all players constituting a team may be used as a condition for success of the authentication processing, alternatively authentication of the legitimacies of some players on the team may be used as a condition for success of the authentication processing.

Supplemental Note 9

In a specific example (supplemental note 9) of any one of the supplemental notes 1 to 4, the second mode is a mode for a competitive event in which a plurality of players including the player competes against each other. In a competitive event in which a plurality of pre-registered players competes against each other, cheating is easily carried out in which the player has another person, such as a skilled gainer, play the game instead of the player. Therefore, a configuration having the second mode for the competitive event is particularly preferable.

Supplemental Note 10

A computer-implemented method of operating a game system (100) according to one aspect (supplemental note 10) of the present disclosure includes selecting one of a plurality of modes including a first mode and a second mode, and permitting a player to play a game without requiring authentication processing using biometric information of the player in the first mode, and permitting the player to play the game subject to success of the authentication processing in the second mode.

Supplemental Note 11

A non-transitory computer-readable recording medium according to one aspect (supplemental note 11) of the present disclosure is a non-transitory computer-readable recording medium storing a program executable by a computer system configured to execute the program to: select one of a plurality of modes including a first mode and a second mode; execute authentication processing using biometric information (B) of a player; permit the player to play a game without requiring the authentication processing in the first mode; and permit the player to play the game subject to success of the authentication processing in the second mode.

DESCRIPTION OF REFERENCE SIGNS

10 . . . management system, 11 . . . controller, 12 . . . storage device, 13 . . . communicator, 20 . . . game apparatus, 21 . . . controller, 22 . . . storage device, 23 . . . communicator, 24 . . . display, 25 . . . operation device, 26 . . . reader, 27 . . . image capturing device, 30 . . . recording medium, 40 . . . terminal device, 41 . . . image capturing device, 42 . . . display, 100 . . . game system, 200 . . . communication network, B . . . biometric information, D . . . identification information, G . . . game data, X . . . registration data.

What is claimed is:

1. A game system comprising:
one or more memories configured to store instructions; and
one or more processors communicatively connected to the one or more memories,
wherein at least one of the one or more processors is configured to access the one or more memories and execute the instructions to cause the at least one of the one or more processors to determine one mode of a plurality of modes including a first mode and a second mode;
at least one of the one or more processors is configured to access the one or more memories and execute the instructions to cause the at least one of the one or more processors to, based on the one mode being the first mode, permit a player to play a game without requiring authentication processing; and
at least one of the one or more processors is configured to access the one or more memories and execute the instructions to cause the at least one of the one or more processors to, based on the one mode being the second mode, execute the authentication processing using biometric information of the player and permit the player to play the game subject to success of the authentication processing,
wherein the game is a competitive game,
the first mode is a final round of the competitive game, and
the second mode is a preliminary round of the competitive game.

2. The game system according to claim 1, wherein, in a case in which the biometric information of the player is not registered in the second mode, the at least one of the one or more processors is further configured to access the one or more memories and execute the instructions to cause the at least one of the one or more processors to execute registration processing to register the biometric information for use in the authentication processing.

3. The game system according to claim 1, wherein the one mode is determined based on a selection by a player of the game.

4. The game system according to claim 1, wherein, in the executing the authentication processing, the at least one of the one or more processors is further configured to access the one or more memories and execute the instructions to cause the at least one of the one or more processors to repeat the authentication processing in parallel with progressing of the game in the second mode.

5. The game system according to claim 1,
wherein the plurality of modes further includes a third mode, and
wherein at least one of the one or more processors is configured to access the one or more memories and execute the instructions to cause the at least one of the one or more processors to, based on the one mode being the third mode, progress the game played by each of a plurality of players selected in accordance with results of the game in the second mode.

6. The game system according to claim 5, wherein, based on the one mode being the third mode, at least one of the one or more processors is further configured to access the one or more memories and execute the instructions to cause the at least one of the one or more processors to permit each of the plurality of players to play the game subject to success of the authentication processing.

7. The game system according to claim 1, wherein, in the executing the authentication processing, the at least one of the one or more processors is further configured to access the one or more memories and execute the instructions to cause the at least one of the one or more processors to execute the authentication processing in response to a request from a terminal device communicable with the game system.

8. The game system according to claim 1,
wherein the game is a game to be played by a team consisting of a plurality of players including the player, and
wherein the authentication processing is executed using biometric information of the plurality of players.

9. The game system according to claim 1, wherein the second mode is a mode for a competitive event in which a plurality of players including the player competes against each other.

10. A computer-implemented method of operating a game system, the method comprising:
determining one mode of a plurality of modes including a first mode and a second mode;
based on the one mode being the first mode, permitting a player to play a game without requiring authentication processing using biometric information of the player; and
based on the one mode being the second mode, executing the authentication processing using the biometric information and permitting the player to play the game subject to success of the authentication processing,
wherein the game is a competitive game,
the first mode is a final round of the competitive game, and
the second mode is a preliminary round of the competitive game.

11. A non-transitory computer-readable recording medium storing a program which, when executed by a computer system, causes the computer system to at least:
determine one mode of a plurality of modes including a first mode and a second mode;
based on the one mode being the first mode, permit a player to play a game without requiring authentication processing; and
based on the one mode being the second mode, execute the authentication processing using biometric information of the player and permit the player to play the game subject to success of the authentication processing,
wherein the game is a competitive game,
the first mode is a final round of the competitive game, and
the second mode is a preliminary round of the competitive game.

* * * * *